Feb. 8, 1927.
P. ALLEN
1,617,004
HANDLE AND SHANK FOR SICKLE BLADES AND THE LIKE
Filed March 27, 1925
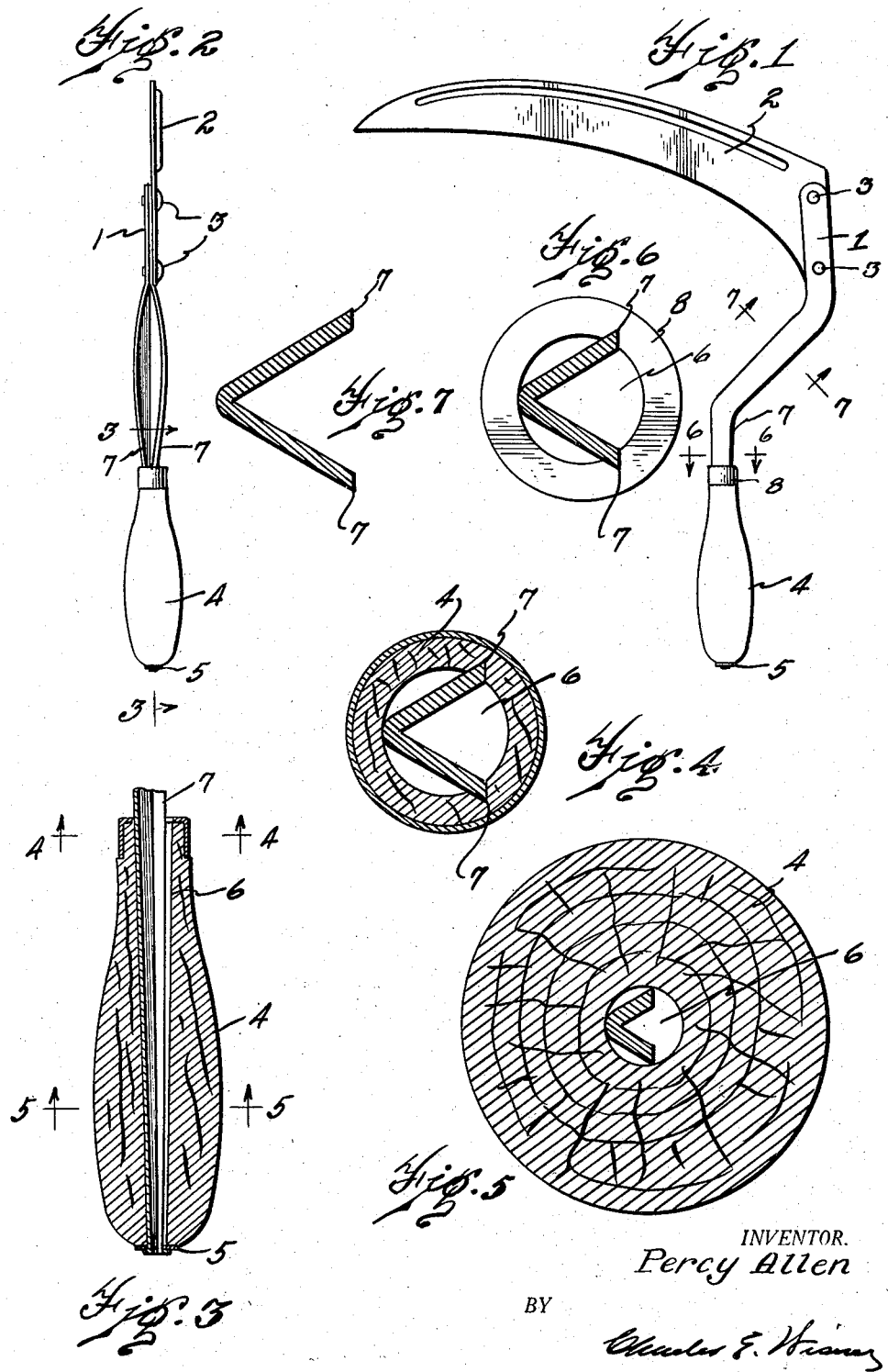
INVENTOR.
Percy Allen
BY
ATTORNEY.

Patented Feb. 8, 1927.

1,617,004

UNITED STATES PATENT OFFICE.

PERCY ALLEN, OF NORTH WAYNE, MAINE, ASSIGNOR TO NORTH WAYNE TOOL CO., OF HALLOWELL, MAINE, A CORPORATION OF MAINE.

HANDLE AND SHANK FOR SICKLE BLADES AND THE LIKE.

Application filed March 27, 1925. Serial No. 18,776.

This invention relates to sickles and the object of the invention is to provide a handle and support for a sickle blade.

One of the principal objects of the invention is to provide a shank for a sickle formed of sheet metal substantially V shaped in cross section and adapted for the attachment of a wooden handle thereto.

Another object of the invention is to provide a shank adapted to extend through the handle and arranged to prevent turning of the handle on the shank and to prevent the possibility of the shank coming out of the handle.

A further object of the invention is to provide a shank which is light in weight and which gives the sickle an inherent balance to increase the ease with which the sickle may be manipulated.

These objects and the several novel features of the invention are hereinafter more fully described and claimed and the preferred form of construction by which these objects are attained is shown in the accompanying drawings in which—

Fig. 1 is an elevation of a sickle embodying my invention.

Fig. 2 is a rear view thereof.

Fig. 3 is an enlarged section taken on line 3—3 of Fig. 2.

Fig. 4 is an enlarged section taken on line 4—4 of Fig. 3.

Fig. 5 is an enlarged section taken on line 5—5 of Fig. 3.

Fig. 6 is an enlarged section taken on line 6—6 of Fig. 1.

Fig. 7 is an enlarged section taken on line 7—7 of Fig. 1.

As shown in Figs. 1, 2 and 7 the shank is formed from sheet metal which is substantially V shaped in cross section and the V portion is flattened at the upper end 1 so that the blade 2 may be secured to the shank by the screws 3 which extend through the blade and are threaded into threaded apertures provided therefor in the flattened end 1 of the shank. The lower end of the shank extends through a wooden handle 4 and tapers toward the end and the extreme lower end of the shank protrudes from the handle as shown in Fig. 3. A washer 5 may be slipped over the lower end of the shank as shown in Fig. 3 and the end of the shank may be peened over the washer to prevent the handle from coming off from the shank.

As shown in Fig. 4 the aperture 6 in the handle 4 is of smaller diameter than the width of the shank and the shank is driven into the handle so that the edges 7 thereof engage firmly in the wood thus anchoring the handle in the wood and preventing the possibility of the handle turning on the shank. The edges 7 of the shank also engage in the metal ferrule 8 of the handle as shown in Fig. 6. By this arrangement the handle is held from turning on the shank and at the same time the sickle is arranged to prevent the shank from pulling out of the handle by means of the washer 5 secured to the extreme tapered end of the shank.

From the foregoing description it becomes evident that the device is very simple and efficient in operation, will not easily get out of order, is of very low manufacturing cost and provides a device which accomplishes the objects described.

Having thus fully described my invention, its utility and mode of operation, what I claim and desire to secure by Letters Patent of the United States is—

1. A handle and shank for sickle blades and the like consisting of a shank substantially V shaped in cross section, one end thereof having the side walls flattened to parallel relation and provided with a pair of threaded apertures to receive the fastening bolts for the blade, the opposite end of the shank being tapered toward the end, a handle provided with a longitudinal aperture, the tapered end of the shank being forced into the aperture to such position that the extreme end extends through the handle and the free edges of the V portion and the point of junction of the two sides provide three points of contact of the shank with the interior wall of the handle, the said free edges being shaped to cut into the said wall of the handle, and a washer secured to the extreme tapered end of the shank for securing the handle in place.

2. A shank and handle for sickle blades and the like consisting of a shank V shaped in cross section, one end thereof being flattened for the attachment of a blade and the other end of the shank being tapered in form, a handle provided with a longitudinal aperture circular in cross section to receive said tapered end, the free edges of the shank and the point of connection of the two sides being forced to frictional engagement with the inner wall of the handle with the extreme end of the shank protruding from the end of the handle, and means at the said extreme end to maintain the handle thereon.

3. A handle and shank for sickle blades and the like consisting of a shank substantially of V shaped form in cross section, one end thereof having the walls of V shape flattened and apertured to receive the fastening bolts for the blade, the opposite end of the shank being offset relative to the flattened end and being tapered in form, the handle having a longitudinal aperture extending therethrough and the handle and shank being assembled by forcing the shank into the aperture to cause the said shank to cut into the inner wall of the handle with the extreme end extending therethrough, and means at the protruding end to prevent withdrawal of the handle.

In testimony whereof I sign this specification.

PERCY ALLEN.